United States Patent [19]

Remick et al.

[11] Patent Number: 4,485,154

[45] Date of Patent: Nov. 27, 1984

[54] ELECTRICALLY RECHARGEABLE ANIONICALLY ACTIVE REDUCTION-OXIDATION ELECTRICAL STORAGE-SUPPLY SYSTEM

[75] Inventors: Robert J. Remick; Peter G. P. Ang, both of Naperville, Ill.

[73] Assignee: Institute of Gas Technology, Chicago, Ill.

[21] Appl. No.: 299,977

[22] Filed: Sep. 8, 1981

[51] Int. Cl.³ .................. H01M 8/04; H01M 8/18; H01M 2/38; H01M 4/36

[52] U.S. Cl. .................. 429/14; 429/15; 429/17; 429/21; 429/51; 429/105

[58] Field of Search .............. 429/14, 15, 17, 19, 429/21, 30, 32, 33, 34, 51, 101, 105

[56] References Cited

U.S. PATENT DOCUMENTS

| | | | |
|---|---|---|---|
| 3,214,296 | 10/1965 | Smatko | 429/68 |
| 3,920,474 | 11/1975 | Zito et al. | 429/15 |
| 3,996,064 | 12/1976 | Thaller | 429/21 |
| 4,215,182 | 7/1980 | Ang et al. | 429/9 |
| 4,220,690 | 9/1980 | Blurton et al. | 429/15 |

Primary Examiner—Brian E. Hearn
Assistant Examiner—Stephen J. Kalafut
Attorney, Agent, or Firm—Thomas W. Speckman

[57] ABSTRACT

An electrically rechargeable anionically active reduction-oxidation electric storage-supply system and process is disclosed using a sodium or potassium sulfide-polysulfide anolyte reaction and an iodide-polyiodide, chloride-chlorine or bromide-bromine species catholyte reaction. The catholyte and anolyte are separated by an ion selective membrane permeable to positive sodium and potassium ions and substantially impermeable to negative bromide, chloride, iodide, sulfide and polysulfide ions. A flowing electrolyte system is disclosed with external electrolyte storage vessels. The apparatus and process provide an electrically rechargeable anionically active reduction-oxidation system in which the electrolytes may be maintained at near neutral or slightly basic pH, with virtually no parasitic side reactions upon charging, such as hydrogen or oxygen evolution, and the disclosed storage and supply system provides higher energy densities than referenced prior art systems.

47 Claims, 2 Drawing Figures

ELECTRICALLY RECHARGEABLE ANIONICALLY ACTIVE REDUCTION-OXIDATION ELECTRICAL STORAGE-SUPPLY SYSTEM

BACKGROUND OF THE INVENTION

1. Field of the Invention

This invention relates to an apparatus and process for storage and supply of electrical energy utilizing an electrically rechargeable reduction-oxidation electrochemical cell using an anionically active species. The electrical storage and supply system of this invention provides ambient temperature operation, and storage capacity independent of both electrode size and peak instantaneous discharge rates. Energy storage is achieved exterior to the electrochemical cell which is operable by a reversible reduction-oxidation flowing electrolyte. The system may be used to store quantities of electrical energy which may be randomly produced such as by wind or optical energy and provide a stable storage and supply system capable of repeated electrical discharging and charging cycles.

2. Description of the Prior Art

Rechargeable secondary batteries with at least one reactive electrode and utilizing a bromide or iodide ion reaction are known by U.S. Pat. No. 3,214,296, while secondary batteries having a least one reactive electrode utilizing a sulfide ion-sulfide composition reaction are shown by U.S. Pat. No. 4,002,807. In each of these cases, the secondary battery is totally self-contained and is limited both in its storage capacity and in its supply capacity to the size of the active electrode region. Circulating electrolytes have been suggested for rechargeable secondary storage batteries of the zinc-halogen type wherein the halogen is stored in a corresponding solid hydrate form as exemplified by U.S. Pat. Nos. 4,105,829 and 4,181,777. However, each of these patents points out the difficulties encountered with electrical and electrode instability.

Electrically regenerable secondary batteries are taught by U.S. Pat. Nos. 3,996,064 and 4,133,941 which teach cationic active reduction-oxidation electrical storage and supply systems with flowing electrolytes. Both of these patents teach chloride ion transfer between a catholyte and anolyte through a permeable membrane and both teach the desirability of strong acid electrolytes. The 3,996,064 patent teaches a single electron transfer system limiting the cationic storage energy capacity.

Reduction-oxidation systems are known utilizing $Br^-/Br_2$, $I^-/I_2$ and $S^{-2}/S_n^{-2}$ are known in the art as exemplified by U.S. Pat. No. 4,215,182. U.S. Pat. No. 4,215,182, however, teaches utilization of a photoelectrochemical membrane cell to regenerate the redox anolyte of a redox-oxygen cell.

A variety reduction-oxidation batteries have been proposed in recent years, as exemplified by the publications: Thaller, L. H., "Recent Advances in Redox Flow Cell Storage Systems". Paper No. *NASA TM*-79186 presented at the Intersociety Energy Conversion Engineering Conference, Boston, August 5-10, 1979; Giner, J., Swette, L., and Cahill, K., "Screening of Redox Couples and Electrode Material", *Final Report GR*134705 *under NASA-Lewis Contract* No. *NAS3*-19760. Waltham, Mass.: Giner, Inc., 1976; and Hodes et al "Electrocatalytic Electrodes for the Polysulfide Redox System", *J. Electrochemical Soc.* 127, 544, 1980 (March). However, the proposed redox batteries have not been as satisfactory as desired: their volumetric storage capacity being relatively low, generally less than 1 mole of electrons per liter of stored electrolyte; parasitic side reactions, such as hydrogen evolution during charging; and requiring expensive and strategically important materials not readily available in this country.

SUMMARY OF THE INVENTION

This invention relates to an electrically rechargeable anionic electro-active reduction-oxidation electrical energy storage and supply system using an electrochemical cell with an anolyte and a catholyte compartment separated by an ion selective membrane permeable to positive sodium and potassium ions and substantially impermeable to negative bromide, chloride, iodide, sulfide and polysulfide ions. Flowing anolyte providing an electrochemically reactable anolyte contacts a first substantially chemically non-reactive electrode while an electrochemically reactable catholyte contacts a second substantially chemically non-reactive electrode, the catholyte and anolyte being separated by the above mentioned ion selective membrane. The anolyte and catholyte may be stored exterior to the electrochemical cell and supplied as needed during the storage and supply cycle. An external electrical circuit is in communication with the first and second electrodes, the electrical circuit having an electrical load means and a direct current supply means for applying charging voltage to the electrodes and electrically connected in parallel in the circuit between the electrodes with switching means for electrical circuit selection between the load, the supply and an open circuit.

In operation, the electrically rechargeable anionic electroactive reduction-oxidation system of this invention stores electrical energy by passing direct current charging voltage across the first and second electrodes providing electrons to the first electrode. A polysulfide compound selected from sodium and potassium and mixtures thereof is reduced to corresponding lower polysulfide and sulfide compounds in an anolyte in contact with the first electrode and ions selected from iodide, chloride, bromide and mixtures thereof are oxidized to corresponding polyiodide, chlorine and bromine species, respectively, in a catholyte in contact with the second electrode. Corresponding positive ions of sodium or potassium pass through the ion selective membrane from the catholyte to the anolyte to complete the electrical circuit. For supplying electrical energy, the electrochemical system is reversed and current is passed from the electrodes to the electrical load providing electrons to the second electrode. The sulfide and lower polysulfide compounds are oxidized to corresponding higher polysulfide compounds in the anolyte in contact with the first electrode and the polyiodide, chlorine and bromine species are reduced to iodide, chloride and bromide ions, respectively, in the catholyte in contact with the second electrode. The positive ions of sodium and potassium pass through the ion selective membrane from the anolyte to the catholyte to complete the electrical circuit.

It is an object of this invention to provide an apparatus and process for electrical energy storage and supply by an electrically rechargeable anionically active reduction-oxidation system.

It is another object of this invention to provide a flowing electrolyte, high capacity, stable electrical energy storage system.

It is another object of this invention to provide electrically rechargeable anionically active reduction-oxidation electrical energy storage and supply systems which can supply higher energy densities than prior art systems.

It is yet another object of this invention to provide electrical energy storage and supply systems having substantially no parasitic side reaction, especially upon charging.

It is still another object of this invention to provide electrical energy storage and supply systems in which the electrolyte may be maintained at a near neutral or slightly basic pH.

BRIEF DESCRIPTION OF THE DRAWINGS

The above objects and advantages of this invention may be more readily understood upon reading of the description of preferred embodiments and by reference to the attached drawings showing certain preferred embodiments of the invention wherein.

DESCRIPTION OF PREFERRED EMBODIMENTS

Figure 1:
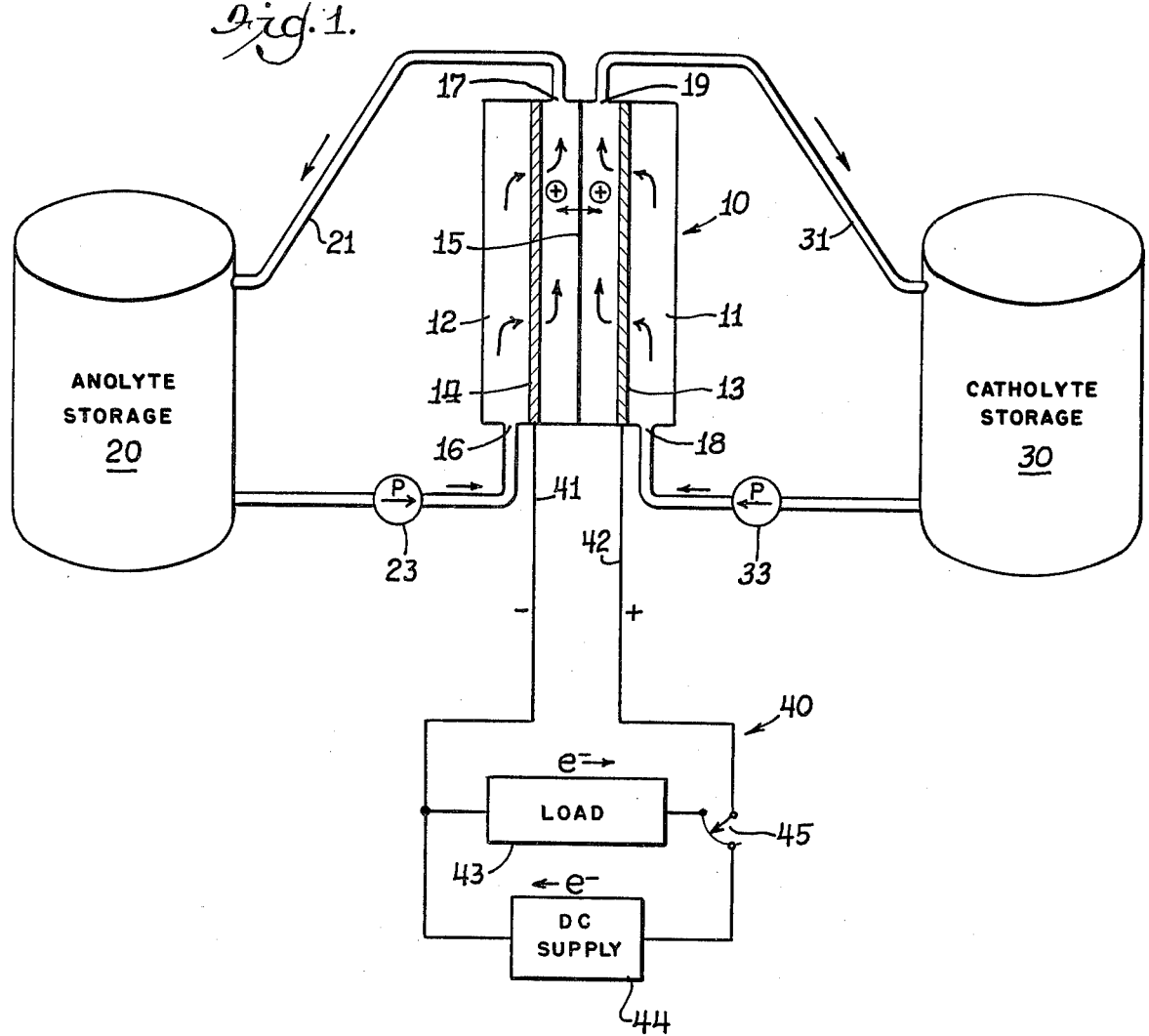
FIG. 1 is a schematic diagram showing the principles of the electrical energy storage and supply system of this invention using flow-through electrodes.

FIG. 1, in simplified schematic form, shows the principles of the electrically rechargeable anionically active reduction-oxidation electrical energy storage and supply system according to one preferred embodiment of this invention. Flow-through electrochemical cell 10 is shown with catholyte compartment 11 and anolyte compartment 12 separated by cation conducting specific ion selective membrane separator 15. An anolyte supply means provides electrochemically reactable anolyte in contact with electrode 14, which is a flow-through eletrode. Fresh anolyte is supplied to anolyte compartment 12 through anolyte inlet 16 by pumping and flow control means 23 from anolyte storage compartment 20. After contacting electrode 14 for the desired electrochemical reaction, the anolyte passes through anolyte outlet 17 and conduit 21 to anolyte storage vessel 20. Likewise, a catholyte supply means provides electrochemically reactable catholyte in contact with electrode 13, which is a flow-through electrode. Fresh catholyte is supplied to catholyte compartment 11 through catholyte inlet 18 by pumping and flow control means 33 from catholyte storage compartment 30. After contacting electrode 13 for desired electrochemical reaction, the catholyte passes through catholyte outlet 19 and conduit 31 to catholyte storage vessel 30.

External electrical circuit 40 is in communication with electrode 14 by electrical lead 41 and with electrode 13 by electrical lead 42. Separate current collectors may be used to facilitate passage of electrons between external electrical circuit 40 and the electrolyte by methods and devices known to the art. Electrical load means 43 and direct current supply means 44 for applying charging voltage are electrically connected in parallel in the electrical circuit between electrode 13 and electrode 14 with switching means 45 for electrical circuit selection between load means 43, direct current supply means 44 and an open circuit. Electrical load means 43 represents any desired electrical load, such as electricity for lighting, motor operation or any other desired electrical function. Direct current supply means 44 represents any source of direct current electrical energy such as derived from wind or water electrical energy generation, photovoltaic cells, or any other means of direct current electrical generation.

The catholyte of the electrochemical cell according to this invention is an aqueous solution of the sodium or potassium salt of chloride, bromide or iodide or mixtures thereof in the discharged state and the corresponding negative ion or elemental form in the charged state. The anolyte of the electrochemical cell of this invention is an aqueous solution of sodium or potassium polysulfide compounds or mixtures thereof in the discharged state and the corresponding lower polysulfide and sulfide compounds in the charged state. The catholyte and anolyte are separated by a cation conducting ion selective membrane separator permeable to positive ions of sodium or potassium and substantially impermeable to negative bromide, chloride, iodide, sulfide and polysulfide ions. Passage of the sodium or potassium ions through the separator membrane completes the electrical circuit of the system. The electrodes in the electrochemical cell of this invention are chemically non-reactive with the anolyte and catholyte. The anolyte and catholyte have a concentration of electrochemical active materials about 1 to about 4 Molar, preferably about 1.5 to about 2.5 Molar and suitable pH's are about 6.0 to about 12, preferably about 7.0 to about 8.0. The anolyte and the catholyte reaction may be illustrated by the following electrochemical reactions:

Anolyte Reaction:

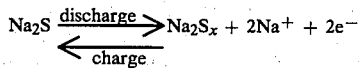

K may be substituted for Na.

Catholyte Reaction:

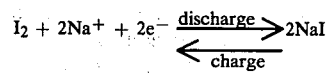

K may be substituted for Na; Br and Cl may be substituted for I. When Br or Cl is substituted for I in the catholyte reaction, bromine or chlorine, respectively, is formed. The formed bromine or chlorine is maintained in solution in the catholyte. It is seen from the above electrochemical reactions that upon discharge, the sulfide and lower polysulfide compounds may be oxidized to different levels of higher polysulfides, such as $S_2{}^{2-}$, $S_3{}^{2-}$ and $S_4{}^{2-}$. The anionically active redox electrical energy storage system of this invention is a two electron transfer system per mole compared to prior systems which provide only one electron transfer per mole. High solubility of the electroactive materials in an aqueous solution allows the storage of over two moles of electrons per liter of electrolyte. Aqueous electrolytes provide good solution stability since the electrochemical reactions involved do not utilize H nor O ions. Further, the electroactive materials used provide large electroactive species for charge storage while providing small size cations for ionic movement through the cell separator. It is also shown in the above electrochemical reactions that the reactions of this invention do not evolve hydrogen or oxygen gas and therefore, all electrical energy is utilized toward charging without the parasitic side reactions experienced in many prior art processes.

Supporting electrolytes to enhance the $Na^+$ or $K^+$ ion concentration in the electrolyte may be used, such as NaCl or KCl in about 1 to about 5 Molar concentration, preferably about 1 to about 2 Molar concentration to reduce salting out and to reduce the volume of the electrochemical cell. The supporting electrolyte does not enter into the electrochemical reaction, but decreases losses in ionic resistance. Both the anolyte and the catholyte are preferably maintained at slightly basic, but near neutral pH's.

The ion selective cell separator membrane may be any suitable membrane permeable to positive sodium and potassium ions and substantially impermeable to negative bromide, chloride, iodide, sulfide and polysulfide ions. The separator membrane should also be substantially impermeable to chlorine, bromine and iodine. Suitable separator materials include nitrocellulose, cellulose acetate, Nafion perfluorosulfonic acid membrane sold by DuPont, and other cation exchange membranes. We have found Nafion 415 to be suitable, showing no degradation in ionic conductivity and a minimum of intermixing of electroactive species during charging-discharging cycling.

Electrodes for use in the electrochemical cell of this invention may be any electroactive material providing electron passage between the electrolyte and the electrical circuit which is non-reactive and stable in the electrolyte. Porous or sheet metal electrodes produced by methods known to the art are suitable, such as carbon-based graphite, platinum, palladium, titanium, Raney catalyst metals and the like. Particularly preferred electrodes for contact with the anolyte are transition metal sulfides including NiS, $Ni_3S_2$, CoS, PbS, and CuS. Preferred electrodes for contact with the catholyte include reticulated vitreous carbon and transition metal dichalcogenides such as $MoSe_2$, $MoS_2$, and $WSe_2$. Sulfided nickel and sulfided cobalt electrodes in contact with the anolyte have been found to be superior than smooth platinum electrodes exhibiting substantially less overpotential, particularly in the charge cycle at higher current densities.

Figure 2:
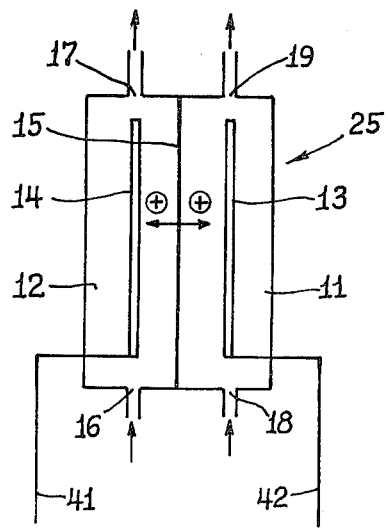
FIG. 2 is a schematic illustration of the electrochemical cell portion of the system of this invention showing flow by electrodes.

While the above description has been with respect to flow-through electrodes as shown in FIG. 1, flow-by electrodes as shown in FIG. 2, or any other electrode design suitable for flowing electrolytes may be used.

Materials of construction of the components of the electrically rechargeable anionically active reduction-oxidation electrical energy storage and supply system of this invention are readily apparent to one skilled in the art upon reading the above disclosure. The electrochemical cell housing, insulation of the two electrodes from each other, electrolyte conduits and electrolyte storage vessels may be of any metallic or polymeric materials known to the art. The apparatus of the present invention, utilizing a slightly basic and close to neutral electrolytes renders very low corrosive systems which may utilize less expensive materials than required by similar prior art processes which have required acidic corrosive electrolyte materials. Sizing of the electrolyte storage vessels and the electrolyte pumping, valving and conduit systems are readily ascertainable after reading of this disclosure by one skilled in the art and are dependent upon electrochemical cell size together with load and direct current supply magnitudes. Individual cells can be connected electrically in series to obtain higher voltages using a common electrolyte or they can be connected electrically in parallel to obtain higher currents. Electrical circuits and switching mechanisms for use with the systems of this invention are readily apparent to one skilled in the art upon reading this disclosure.

The systems of the present invention can supply higher energy densities than prior electrical energy storage-supply cells due to the higher concentrations of active chemicals which can be accommodated by the aqueous electrolyte and the two electron transfer system. For example, the electrochemical cells of the present invention may operate at higher voltages; about 1.5 volts when bromides are used; about 1.8 volts when chlorides are use; and about 1.0 volts when iodides are used. The electrochemical storage-supply cells of the present invention operate efficiently with chemically inert electrodes requiring much less expensive electrode materials and much less expensive containment vessels, due to both electrolytes being maintained under near neutral conditions.

The following specific examples are set forth as exemplary of specific embodiments of this invention and use of specific materials and conditions is not meant to limit the invention.

EXAMPLE I

A flowing redox sulfide-polysulfide half cell fabricated using a sulfided nickel foil electrode and a smooth platinum electrode for comparison was operated at a current density of 50 mA/cm$^2$ in an electrolyte of 0.9 Molar $Na_2S$ +0.1 Molar sulfur +1.0 Molar NaCl well stirred at 25° C. The sulfided electrode was prepared by heating nickel foil to 400° C. in an inert atmosphere and reacted with $H_2S$ by passing an equal mixture of $H_2S$ and $H_2$ gas over the nickel foil at 400° C. for 20 minutes. The overpotential of the sulfide-polysulfide electrode was measured during the charge cycle of the battery at 90 percent charge and was found to be 300 mV on the smooth platinum electrode and 120 mV on the sulfided nickel foil electrode.

EXAMPLE II

A sulfur-bromine redox battery was fabricated with the electrode in contact with the catholyte being a flow-by solid graphite plate and the electrode in contact with the anolyte being a flow-through sulfided porous sintered nickel electrode 1 mm thick. The electrodes each had a 35 cm$^2$ frontal area and were placed 100 mils apart separated by a Nafion 125 membrane separator. Current collectors were located adjacent each electrode with suitable lead wires. The catholyte compartment was filled with catholyte flowing by the graphite electrode, the catholyte being an aqueous solution of 1 Molar sodium bromide saturated with bromine at 25° C. and in contact with liquid bromine, representing 100 percent charge. The anolyte compartment was filled with anolyte flowing through the porous sulfided nickel electrode, the anolyte being a 2 Molar sodium sulfide solution, representing 100 percent charge. At full charge an open-circuit voltage of 1.74 volts was measured; at approximately 50 percent charge the open-circuit voltage was 1.5 volts. The following charge-discharge characteristics were measured at the 50 percent state-of-charge:

| Amps | Volts | |
|---|---|---|
| | Charge | Discharge |
| 0.25 | 1.70 | 1.42 |
| 0.50 | 1.87 | 1.30 |
| 0.75 | 2.05 | 1.15 |
| 1.00 | 2.25 | 1.00 |
| 1.25 | — | 0.86 |
| 1.50 | — | 0.70 |

The electrically rechargeable anionically active reduction-oxidation batteries of this invention do not require expensive and scarce noble metal catalysts on either of the electrodes as, for example, used in present day iron-chromium batteries. Likewise, the batteries of this invention do not require large quantities of expensive strategically important materials, such as chromium, the present iron-chromium batteries requiring a minimum of 37 moles of chromium chloride per kilowatt-hour of storage capacity. Further, the cell voltage of the sulfur-bromine cell of this invention is 50 percent higher than achieved with the iron-chromium cell.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. An electrically rechargeble anionically active reduction-oxidation electrical energy storage and supply system comprising:

an electrochemical cell comprising an anolyte compartment and a catholyte compartment separated by an ion selective membrane permeable to positive sodium and potassium ions and substantially impermeable to negative bromide, chloride, iodide, sulfide and polysulfide ions and a first and a second electrode disposed in said anolyte and catholyte compartments, respectively;

anolyte supply means providing anionically active ions in an aqueous solution electrochemically reactable anolyte in contact with said first electrode, said first electrode being substantially chemically non-reactive with said anolyte;

catholyte supply means providing anionically active ions in an aqueous solution electrochemically reactable catholyte in contact with said second electrode, said second electrode being substantially chemically non-reactive with said catholyte;

said anolyte and said catholyte having all active reduction-oxidation couples as anions; and an external electrical circuit in electrical communication with said first and second electrodes, said electrical circuit comprising an electrical load means and a direct current supply means for applying charging voltage to said electrodes electrically connected in parallel in said circuit between said electrodes, and switching means for electrical circuit selection between said load means, said supply means, and an open circuit.

2. The electrically rechargeable anionically active reduction-oxidation electrical energy storage and supply system of claim 1 wherein said anolyte compartment is filled with flowing anolyte comprising aqueous solution of electrochemically active material selected from the group consisting of sodium and potassium polysulfide compounds and mixtures thereof in the discharged state and the corresponding lower polysulfide and sulfide compounds and mixtures thereof in the charged state.

3. The electrically rechargeable anionically active reduction-oxidation electrical energy storage and supply system of claim 2 wherein said anolyte has a concentration of about 1.0 to about 4 Molar of said electrochemically active material.

4. The electrically rechargeable anionically active reduction-oxidation electrical energy storage and supply system of claim 3 wherein said concentration is about 1.5 to about 2.5 Molar.

5. The electrically rechargeable anionically active reduction-oxidation electrical energy storage and supply system of claim 3 wherein said anolyte further comprises supporting electrolyte selected from the group consisting of NaCl and KCl in about 1 to about 5 Molar concentration.

6. The electrically rechargeable anionically active reduction-oxidation electrical energy storage and supply system of claim 3 wherein the pH is maintained at about 6.0 to about 12.

7. The electrically rechargeable anionically active reduction-oxidation electrical energy storage and supply system of claim 6 wherein the pH is maintained at about 7.0 to about 8.0.

8. The electrically rechargeable anionically active reduction-oxidation electrical energy storage and supply system of claim 5 wherein the pH is maintained at about 6.0 to about 12.

9. The electrically rechargeable anionically active reduction-oxidation electrical energy storage and supply system of claim 8 wherein the pH is maintained at about 7.0 to about 8.0.

10. The electrically rechargeable anionically active reduction-oxidation electrical energy storage and supply system of claim 1 wherein said catholyte compartment is filled with flowing catholyte comprising aqueous solution selected from the group consisting of the sodium and potassium salt of chloride, bromide, iodide and mixtures thereof in the discharged state and the corresponding negative ion or elemental form in the charged state.

11. The electrically rechargeable anionically active reduction-oxidation electrical energy storage and supply system of claim 10 wherein said catholyte has a concentration of about 1.0 to about 4 Molar of said electrochemically active material.

12. The electrically rechargeable anionically active reduction-oxidation electrical energy storage and supply system of claim 11 wherein said concentration is about 1.5 to about 2.5 Molar.

13. The electrically rechargeable anionically active reduction-oxidation electrical energy storage and supply system of claim 11 wherein said catholyte further comprises supporting electrolyte selected from the group consisting of NaCl and KCl in about 1 to about 5 Molar concentration.

14. The electrically rechargeable anionically active reduction-oxidation electrical energy storage and supply system of claim 11 wherein the pH is maintained at about 6.0 to about 12.

15. The electrically rechargeable anionically active reduction-oxidation electrical energy storage and supply system of claim 14 wherein the pH is maintained at about 7.0 to about 8.0.

16. The electrically rechargeable anionically active reduction-oxidation electrical energy storage and supply system of claim 13 wherein the pH is maintained at about 6.0 to about 12.

17. The electrically rechargeable anionically active reduction-oxidation electrical energy storage and supply system of claim 16 wherein the pH is maintained at about 7.0 to about 8.0.

18. The electrically rechargeable anionically active reduction-oxidation electrical energy storage and supply system of claim 1 wherein said ion selective membrane is selected from the group consisting of nitrocellulose, cellulose acetate and perfluorosulfonic acid (Nafion).

19. The electrically rechargeable anionically active reduction-oxidation electrical energy storage and supply system of claim 18 wherein said ion selective membrane is Nafion 415.

20. The electrically rechargeable anionically active reduction-oxidation electrical energy storage and supply system of claim 1 wherein said first electrode is selected from the group consisting of carbon-based graphite, platinum, palladium, titanium, Raney catalyst metals and transition metal sulfides.

21. The electrically rechargeable anionically active reduction-oxidation electrical energy storage and supply system of claim 20 wherein said first electrode is a transition metal sulfide selected from the group consisting of NiS, $Ni_3S_2$, CoS, PbS and CuS.

22. The electrically rechargeable anionically active reduction-oxidation electrical energy storage and supply system of claim 1 wherein said second electrode is selected from the group consisting of carbon-based graphite, platinum, palladium, titanium, Raney catalyst metals and transition metal dichalcogenides.

23. The electrically rechargeable anionically active reduction-oxidation electrical energy storage and supply system of claim 22 wherein said second electrode is a transition metal dichalcogenide selected from the group consisting of $MoSe_2$, $MoS_2$ and $WSe_2$.

24. A process for electrical energy storage and supply by an electrically rechargeable anionically active reduction-oxidation system having all active reduction-oxidation couples as anions comprising:

A. storing electrical energy in said system by the steps comprising:
   passing direct current charging voltage across a first and second electrode providing electrons to said first electrode;
   reducing polysulfide compounds selected from the group consisting of sodium and potassium and mixtures thereof to corresponding lower polysulfide and sulfide compounds in an anolyte in contact with said first electrode;
   oxidizing halide ions selected from the group consisting of iodide, chloride, bromide and mixtures thereof to corresponding polyiodide, chlorine and bromine species in a catholyte in contact with said second electrode; and
   positive ions selected from the group consisting of sodium, potassium and mixtures thereof passing through an ion selective membrane, substantially impermeable to negative bromide, chloride, iodide, sulfide and polysulfide ions, from said catholyte to said anolyte to complete the electrical circuit; and B. supplying electrical energy from said system by the steps comprising:
   passing current from said first and second electrode to an electrical load providing electrons to said second electrode;
   oxidizing said sulfide and lower polysulfide compounds to corresponding higher polysulfide compounds in an anolyte in contact with said first electrode;
   reducing said polyiodide, chlorine or bromine species to said halide ions in a catholyte in contact with said second electrode; and
   said positive ions passing through said ion selective membrane from said anolyte to said catholyte to complete the electrical circuit.

25. The process of claim 24 wherein said anolyte is a flowing anolyte comprising aqueous solution of electrochemically active material selected from the group consisting of sodium and potassium polysulfide compounds and mixtures thereof in the discharged state and the corresponding lower polysulfide and sulfide compounds and mixtures thereof in the charged state.

26. The process of claim 25 wherein said anolyte has a concentration of about 1.0 to about 4 Molar of said electrochemically active material.

27. The process of claim 26 wherein said concentration is about 1.5 to about 2.5 Molar.

28. The process of claim 26 wherein said anolyte further comprises supporting electrolyte selected from the group consisting of NaCl and KCl in about 1 to about 5 Molar concentration.

29. The process of claim 26 wherein the pH is maintained at about 6.0 to about 12.

30. The process of claim 29 wherein the pH is maintained at about 7.0 to about 8.0.

31. The process of claim 28 wherein the pH is maintained at about 6.0 to about 12.

32. The process of claim 31 wherein the pH is maintained at about 7.0 to about 8.0

33. The process of claim 24 wherein said catholyte compartment is filled with flowing catholyte comprising aqueous solution selected from the group consisting of the sodium and potassium salt of chloride, bromide, iodide and mixtures thereof in the discharged state and the corresponding negative ion or elemental form in the charged state.

34. The process of claim 33 wherein said catholyte has a concentration of about 1.0 to about 4 Molar of said electrochemically active material.

35. The process of claim 34 wherein said concentration is about 1.5 to about 2.5 Molar.

36. The process of claim 34 wherein said catholyte further comprises supporting electrolyte selected from the group consisting of NaCl and KCl in about 1 to about 5 Molar concentration.

37. The process of claim 34 wherein the pH is maintained at about 6.0 to about 12.

38. The process of claim 37 wherein the pH is maintained at about 7.0 to about 8.0.

39. The process of claim 36 wherein the pH is maintained at about 6.0 to about 12.

40. The process of claim 39 wherein the pH is maintained at about 7.0 to about 8.0

41. The process of claim 24 wherein said ion selective membrane is selected from the group consisting of nitrocellulose, cellulose acetate and perfluorosulfonic acid (Nafion).

42. The process of claim 41 wherein said ion selective membrane is Nafion 415.

43. The process of claim 24 wherein said first electrode is selected from the group consisting of carbon-based graphite, platinum, palladium, titanium, Raney catalyst metals and transition metal sulfides.

44. The process of claim 43 wherein said first electrode is a transition metal sulfide selected from the group consisting of NiS, $Ni_3S_2$, CoS, PbS and CuS.

45. The process of claim 24 wherein said second electrode is selected from the group consisting of carbon-based graphite, platinum, palladium, titanium, Raney catalyst metals and transition metal dichalcogenides.

46. The process of claim 45 wherein said second electrode is a transition metal dichalcogenide selected from the group consisting of $MoSe_2$, $MoS_2$ and $WSe_2$.

47. The process of claim 24 wherein said anolyte comprising reduced lower polysulfide and sulfide compound is stored in an anolyte storage vessel external to the electrochemical cell and said catholyte comprising said corresponding oxidized polyiodide, chlorine and bromine species is stored in a catholyte storage vessel external to the electrochemical cell, and each said stored anolyte and stored catholyte is withdrawn from its respective storage vessel and passed in contact with said first and second electrode, respectively, for supplying electrical energy.

* * * * *